Jan. 2, 1968          O. WICHTERLE          3,361,858
RESHAPING A XEROGEL BY MECHANICAL REMOVAL AND SWELLING TO
FORM A HYDROGEL CONTACT LENS
Filed Jan. 7, 1965
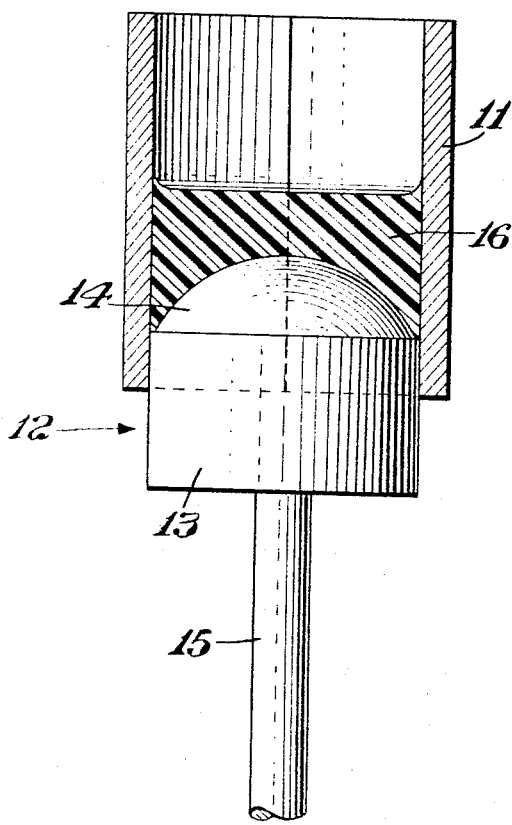
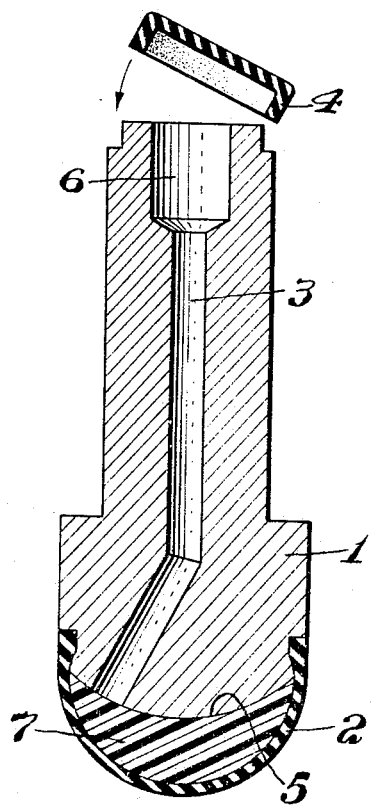
INVENTOR.
Otto Wichterle

United States Patent Office 3,361,858
Patented Jan. 2, 1968

3,361,858
RESHAPING A XEROGEL BY MECHANICAL REMOVAL AND SWELLING TO FORM A HYDROGEL CONTACT LENS
Otto Wichterle, Prague, Czechoslovakia, assignor to Ceskoslovenska akademie ved, Prague, Czechoslovakia
Filed Jan. 7, 1965, Ser. No. 424,065
Claims priority, application Czechoslovakia, Sept. 7, 1963, 4,971/63
10 Claims. (Cl. 264—1)

This invention relates to contact lenses, and particularly to contact lenses which consist essentially of a hydrogel of a sparingly cross-linked organic polymer. More specifically, the invention relates to a method for making such contact lenses and to apparatus for carrying out the method.

This application is a continuation in part of my copending application Ser. No. 393,506, filed Sept. 1, 1964, now abandoned.

In my copending application Ser. No. 423,034, filed on Jan. 4, 1965, I have disclosed how contact lenses may be made by co-polymerizing a suitable mixture of hydrophilic monomers and cross linking agents in the presence of a swelling agent in a rotating mold. The lenses so produced have an outer convex face which conforms to the mold and may be shaped at will by selection of the proper mold shape. The opposite concave lens surface inherently has a shape approximating that of a paraboloid.

The instant invention is concerned with a method and apparatus for making contact lenses which may have concave surfaces other than the approximately paraboloidal surfaces of my earlier application. A more specific object of this invention is the provision of a method and of apparatus for preparing soft and resilient contact lenses having the necessary configuration for correcting severe anastigmatism and localized irregularities of a patient's cornea. Contact lenses suitable for this purpose were heretofore prepared by grinding and polishing a blank consisting of a hard transparent polymer, such as polymethylmethacrylate, but could not be made from the soft and resilient hydrogels of sparingly cross-linked synthetic polymers which have many known advantages over the hard plastic lenses.

I have found that the hydrogels of my earlier application can be converted to xerogels, that analogous xerogels may be produced directly by polymerization of the same monomers under suitable conditions, and that the xerogels, in whichever manner they are prepared, are capable of being shaped into replicas of the desired lens by mechanical removal of selected portions, as by cutting, grinding, and polishing. The mechanically worked xerogel replicas may then be converted to finished contact lenses by contacting them with an aqueous liquid until they reach a condition of osmotic equilibrium with body fluids or with physiological saline solution.

The term "xerogel" as employed in this specification and the appended claims generally indicates a colloidal material hard enough to permit cutting and machining, and having the approximate consistency of commercial glue. The water content of a xerogel prepared by removal of water from a hydrogel generally is between 0 and 10 percent, but it is usually more practical to identify a xerogel by its hardness to touch and by its brittleness than by any numerically expressed property. It is characteristic of a xerogel that it is converted to a hydrogel by contact with water.

The hydrogels employed in the method of this invention are three-dimensional macromolecules having a degree of cross linking merely sufficient to make the lenses shape-retaining in the absence of external forces substantially greater than those of terrestrial gravity, and sufficiently resilient to recover their original shape after moderate deformation. Typical hydrophilic monomers from which the lens materials of the invention may be prepared by copolymerization include the mono- and dimethacrylates of ethylene glycol and of the polyethers of ethylene glycol which are dihydric alcohols and will be referred to hereinafter as polyglycols, also methacrylamide, the corresponding esters and amide of acrylic acid, the glycol and polyglycol esters of itaconic acid and of other olefinic acids capable of polymerization, allyl esters of non-cyclic organic acids having reactive hydroxyl groups such as tartaric, malic, or pyruvic acids, the vinyl esters of such hydroxy acids, the vinyl and allyl ethers of glycols and polyglycols and their acylated derivatives.

It is a common feature of these hydrogels that they are transparent masses, very soft and resilient when swollen to a condition of osmotic equilibrium with physiological saline solution, but rather hard and brittle when they contain only small amounts of swelling agent, if any, and are xerogels.

Extensive clinical tests have shown that polymers of the afore-mentioned acrylic and methacrylic compounds may safely be left in contact with the cornea of a lens wearer for long periods, and data available so far concerning the copolymers of the other olefinic monomers and cross linking agents referred to in this specification do not show any harmful effects.

If the copolymerization reaction is carried out in the presence of a swelling agent such as water or glycol, the xerogel is prepared from the swollen polymer by very gradual removal of the swelling agent. Controlled slow drying removes water to the necessary extent to yield a xerogel hard enough and brittle enough to permit grinding and polishing. It is also possible to displace a less volatile swelling agent, such as water or glycol, by a more volatile one which is then evaporated. Furthermore, the swelling agent may be removed from the hydrogel by contact with a relatively concentrated aqueous electrolyte solution which itself cannot cause swelling.

A xerogel may be prepared directly from the monomers by copolymerization in the absence of swelling agents or in the presence of an amount of swelling agent too small to reduce the hardness and brittleness of the copolymer to a significant extent.

In whichever manner the xerogel is prepared, I prefer to remove water soluble non-polymeric substances, such as polymerization initiators or catalysts, residual monomers, and other soluble materials from the lens blank or lens replica after mechanical shaping by contacting the shaped object with suitable solvents.

Swelling increases the size of the original xerogel at a uniform rate in the three dimensions of length, width, and thickness. When working with a new material or under new conditions, I make a test run to determine the dimensional increase to be expected during swelling, and I am guided accordingly when shaping an actual blank. With the same monomer mixture and under reasonably uniform conditions of operation, the swelling behavior of a xerogel can be predicted from the test run with great precision, and the percentage change of each dimension is not affected by the magnitude of the dimension nor by the shape of the xerogel prior to swelling.

Contamination of the polymer is to be avoided. Glass, stainless steel, and other corrosion resistant metals are preferred materials of construction for the polymerization containers. Because of the minute dimensions of the ultimate product, a glass test tube is a suitable polymerization vessel, and the temperature of the polymerization reaction may be conveniently controlled by external cooling. The monomer mixture may also be cast on a polished glass plate, and is preferably protected by a blanket of an inert gas.

If the polymerization mixture originally contains more water or other swelling agent than is desired in the xerogel, the polymer is slowly dried. The drying rate must be controlled in such a manner that the swelling agent may migrate to the surface at approximately the same rate at which it is lost by evaporation. If this precaution is not taken, cracks may form or inner stresses may be set up in the xerogel. The gel is preferably cut into small blanks before it becomes fully hard and brittle. The fully dried pieces may be adhesively secured to a rotary pad or spindle, and one surface may be machined, ground, and polished, the workpiece is then reversed and the opposite surface is shaped while the first finished surface is attached to the rotating support.

The same procedure may be followed when the swelling agent is removed by contact with a liquid such as glycerol or concentrated calcium chloride solution or by extraction with a volatile solvent. A readily machinable xerogel blank is obtained in whatever manner the swelling agent is removed.

If so desired, a small amount of substantially non-volatile swelling agent, such as ethylene glycol or glycerol, may be intentionally left in the blank as a plasticizer to control brittleness and to facilitate shaping of the thin circular edge of the lens.

Hydrophilic polymers having free alcoholic hydroxyl groups may undergo undesirable cross-linking by formation of ether bonds if kept at elevated temperatures for extended periods. When water or another swelling agent is removed by drying, the temperature of the drying chamber should therefore be kept rather low. For the same reason, glycerol or concentrated calcium chloride solutions should not be used near their boiling temperatures in extracting water from a swollen hydrogel of the invention. Temperatures lower than 100° C. are generally preferred during drying, and the rate of evaporation of a swelling agent having a low vapor pressure at such temperatures, such as ethylene glycol, may be hastened by the use of vacuum.

After cutting, grinding, and polishing, the xerogel lens is carefully cleaned of any abrasive material and lubricant employed in the shaping operation. I prefer a volatile solvent for this purpose such as petroleum ether, heptane, ethyl ether, or the like. Aqueous cleaning solution containing surface active agents may also be used.

When subsequently soaked in aqueous liquids, and ultimately in physiological saline solution, the xerogel is converted to a hydrogel in osmotic equilibrium with the saline solution, and soluble impurities are removed. The dimensions of the xerogel lens are simultaneously increased.

When preparing a xerogel directly from a mixture of monomers in the absence or virtual absence of a swelling agent, I prefer to employ special apparatus of which two embodiments are illustrated in the attached drawing in which FIG. 1 is a side-elevational axially sectional view of a mold assembly; and FIG. 2 shows a stationary mold assembly in a view corresponding to that of FIG. 1.

The mold illustrated in FIG. 1 consists essentially of a cylindrical tube 11 and a plunger 12 coaxially received in the tube. The tube 11 is split in an axial plane, and is normally held in the illustrated position by a pipe clamp, not shown.

The plunger 12 has a cylindrical portion 13 which sealingly engages the tube 11. An integral axial projection 14 of the plunger 12 in the tube 11 is a segment of a sphere whose center is in the common axis of the tube 11 and the plunger 12. A coaxial rod 15 is fixedly fastened to the flat radial face of the plunger portion 13 outside the tube 11.

The convex free surface of the projection 14 has a radius of curvature which is smaller than that of the contact lens to be produced by an amount determined by the dimensional change during the swelling of a xerogel blank that is prepared in the mold by copolymerization of a mixture 16 of a major amount of a polymerizable hydrophilic monomer with a small amount of a cross-linking agent in the presence of a catalyst, as will be illustrated hereinafter by specific examples. The mixture yields a hard blank having the general shape of a short cylinder formed with a spherically curved recess in one end face.

The split tube 11 is removed, and the polymerized mixture 16 adheres firmly to the conforming spherical projection 14. The rod 15 is inserted into the chunk of a lathe or similar device, not illustrated, and the xerogel blank is machined, ground, and polished while rotating about the plunger axis. Enough of the polymerized material is removed to produce a convex surface which is usually spherical and centered in the axis of the plunger 12, but may be modified to suit specific requirements in a manner well known in itself.

There is ultimately obtained a xerogel lens which differs in its dimensions from the contact lens to be produced by an empirical factor to compensate for the increase in dimensions during later swelling.

After polishing, the xerogel lens is cleaned to remove abrasive particles and polishing lubricant, and the plunger 12 with the adhering xerogel lens is immersed in a liquid swelling agent, such as a mixture of equal parts of water and ethanol. The lens expands and softens upon immersion, and spontaneously separates from the projection 14. It may then be stored in physiological saline solution until it is used. The mold parts are reassembled, and another molding and shaping cycle may begin. The number of xerogel lenses that can be prepared in a single mold of the type shown in FIG. 1 is almost unlimited. The mold is not subject to wear or significant deterioration when made of glass and/or corrosion resistant metal.

The technique employed in preparing contact lenses with the apparatus shown in FIG. 1 is similar in many aspect to the conventional method of preparing contact lenses from polymethyl methacrylate. An optician skilled in the known method can produce the contact lenses of the invention without requiring additional skills. He will actually produce fewer rejects under otherwise similar conditions because he does not have to finish more than one curved surface of the lens.

FIG. 2 shows another mold for making hydrogel or xerogel lenses according to this invention. The mold includes a rod 1 of circular cross section. In the operative position illustrated, the upper part of the rod 1 is generally cylindrical, and the lower part forms an enlarged head whose axially terminal free face 5 is a convex segment of a sphere. A membrane 2 of soft rubber which has the approximate shape of a hollow hemisphere when in the relaxed condition is secured to the rod 1 by the resilient engagement of the membrane rim with an annular circumferential groove in the head of the rod 1. The face 5 and membrane 2 define therebetween a mold cavity whose volume varies with the difference between the internal pressure in the mold cavity and ambient pressure.

A duct 3 extends in a mainly axial direction from an enlarged orifice 6 in the end face of the rod 1 remote from the face 5 to an orifice in the latter face which is offset from the axis of symmetry of the mold cavity. A rubber cap 4 may be resiliently engaged with an annular groove in the rod 1 about the enlarged orifice 6 of the duct 3 to close the latter.

In the illustrated operative position of the mold, the mold cavity is filled with a liquid polymerization mixture 7.

The mold shown in FIG. 2 may be operated in various ways, but the following procedure is preferred:

The orifice 6 is connected to a vacuum pump, and air is withdrawn from the mold cavity, whereby the rubber membrane 2 conformingly engages the face 5 of the rod 1. The cap 4 is placed over the orifice 6 before interrupting the connection to the vacuum pump. The material to be polymerized is injected into the evacuated mold through the orifice 6 by means of a syringe whose needle pierces the cap 4.

The injected material is polymerized in the mold while being protected from oxygen in the atmosphere. As the polymerization mixture shrinks during polymerization, the membrane 2 contracts. The polymer body formed has a concave surface which conforms to the face 5, and a convex surface whose radius of curvature depends on the amount of polymerization mixture injected into the mold. It requires little machining, if any, but I prefer to grind a sharp edge on the xerogel body where the concave and convex surfaces meet.

If a vacuum apparatus which would permit the cap 4 to be applied within an evacuated space is not available, the apparatus shown in FIG. 2 may be modified to provide an air vent which permits filling of the mold cavity at ambient pressure without forming air bubbles in the polymerization mixture. The vent may be another duct similar to the illustrated duct 3 or an open axial groove in the circumferential face of the rod 1.

The following examples are further illustrative of the method of the invention and of the manner in which the molds illustrated and described hereinabove may be used, but it will be understood that the invention is not limited to the examples.

EXAMPLE 1

A polymerization mixture was prepared by combining 58 parts (by weight) ethylene glycol monomethacrylate, 17 parts diethylene glycol monomethacrylate, 0.4 part diethylene glycol dimethacrylate, 21.7 parts of an aqueous 1% ammonium persulfate solution, and 3 parts dimethylaminoethyl acetate in this order at a temperature of 0° C. As soon as the last ingredient had been admixed, the mixture was deaerated in a vacuum chamber, and poured into a pre-chilled test tube of 12 mm. diameter. The test tube was placed in an ice box, and its contents were inspected from time to time.

After three hours, the polymerization mixture was converted to a transparent gel free from bubbles. The test tube was removed from the ice box, permitted to assume ambient temperature, and was then heated to 40° C. for 40 minutes. The contents of the test tube were shape retaining, and the test tube was carefully broken so as not to damage the polymer rod obtained. The latter was stored in a chamber whose atmosphere was controlled at a temperature of 20° to 25° C. and a relative humidity of 30 to 40%.

After a week of storage, the polymer rod was rigid enough to permit slicing into flat disks and rough machining of the disks. The disks were then returned to the drying chamber for 30 days, whereupon they were rigid enough to permit grinding and polishing with an oil-based soft abrasive paste of the type usually employed in finishing polymethacrylate lenses. The polished lenses were rinsed with ethyl ether, then thoroughly washed with warm distilled water, and then immersed in physiological saline solution until they reached osmotic equilibrium. A small amount of a bactericide may be added to the saline solution if a lens is to be stored for an extended period prior to use.

EXAMPLE 2

A polymerization mixture was prepared by first combining 55 parts (by weight) ethylene glycol monomethacrylate, 20 parts diethylene glycol monomethacrylate, 0.3 part ethylene glycol dimethacrylate, 20 parts water, 2 parts of an aqueous 5% potassium pyrosulfite solution, and 2.6 parts of an aqueous 5% ammonium persulfate solution at ambient temperature (20° C.). Ultimately 0.05 part of an aqueous 0.1% solution of $CuCl_2 \cdot 2H_2O$ were admixed, the mixture was briefly deaerated in a vacuum chamber, and then poured at once on a horizontal flat surface of a glass plate having a raised rim, and thereby constituting a very shallow casting mold. The layer of the polymerization mixture on the glass plate was about 4 mm. thick.

The glass plate carrying the polymerization mixture was stored in a closed chamber having an inert atmosphere of pure nitrogen and initially refrigerated to 10° C. After two hours at that temperature, the chamber and its contents were permitted to assume ambient temperature. After eight additional hours in the inert atmosphere, the polymerization mixture was converted to a gelatine-like transparent foil which readily separated from the glass surface. It was cut into small disks, and the disks were slowly dried in the controlled atmosphere chamber described in Example 1 until a sample disk was rigid enough to permit machining. The machined disks were further dried until hard enough for grinding and polishing.

The xerogel lenses obtained were rinsed with petroleum ether, washed in aqueous 80% ethanol and then in distilled water, and were ultimately immersed in physiological saline solution. The refractive power of the hydrogel lenses obtained was measured at osmotic equilibrium with the saline solution.

The lathe and grinder employed had copying attachments which scanned a model made from a cast of the patient's eye. The concave surface of the xerogel was a replica of the corresponding surface of the cast on a slightly reduced scale.

EXAMPLE 3

A polymerization mixture was prepared at 0° C. from 75 parts ethylene glycol monomethacrylate, 13 parts diethylene glycol monomethacrylate, 10 parts triethylene glycol monomethacrylate, 0.4 part diethylene glycol dimethacrylate, 0.4 part dibenzoyl peroxide, 1.2 parts p-toluenesulfinic acid, and 0.05 part of an aqueous 5% solution of the complex compound of copper benzoate with pyridine. The mixture was briefly deaerated, and a group of small molds of the type shown in FIG. 1 was charged with respective portions of the mixture.

The molds were stored at 40° C. in a chamber having an inert nitrogen atmosphere until the several xerogel lens blanks were hard enough to permit cutting on a lathe and grinding. The cylindrical tubes 11 were removed, and each lens blank was machined and ground to produce a spherical convex surface which formed a thin tapering edge with the concave blank surface conforming to the mold plunger 12.

The plungers and the attached xerogel lenses were immersed in 96% ethanol which caused swelling of the xerogel lens and spontaneous separation from the mold plunger. The remainder of the polymerization initiator system also was removed by the immersion in alcohol. The lenses were washed sequentially in mixtures of water and alcohol of decreasing alcohol content, and ultimately in pure distilled water. They were then stored in physiological saline solution containing a small amount of tetracycline hydrochloride as a bactericidal agent.

EXAMPLE 4

An aqueous 2% solution of polyvinyl alcohol was forced under pressure through a filter medium whose pores were fine enough to retain all suspended solids originally present in the solution. The solution was then evaporated to a vinyl alcohol content of 50%. Oxalic acid was added to the viscous fluid obtained in a ratio of one part oxalic acid per one hundred parts polyvinyl alcohol originally present, and the mixture obtained was poured into a flat dish in which it formed a layer 10 millimeters thick. The open top of the dish was sealed with a thin polyethylene foil, and the closed dish was stored for several months at room temperature in a chamber whose relative humidity was somewhat less than 50% over the period of storage. The water vapor permeability of the polyethylene foil was such that water migrated to the free surface of the polymerization mixture at a very slow rate and significant differences in water content between the several strata of the polymerization mixture were avoided.

When inspected after drying, the contents of the dish formed a plate which appeared to be free from water. Cross-linking ether bonds were formed in the polymer by storing the plate in a heated chamber whose temperature was raised at a rate of 5° C. per day until a temperature of 130° C. was reached. The chamber and its contents were then permitted slowly to cool to room temperature. The xerogel was cut into small disks which were further machined, ground, and polished in the manner described in the preceding examples. One of the disks was precisely measured, stored in physiological saline solution until it reached osmotic equilibrium, and measured again. The measured expansion of the disk by swelling was taken into consideration in shaping the xerogel lenses. The latter were washed and contacted with physiological saline solution until they reached osmotic equilibrium.

Analogous results were obtained when oxalic acid was replaced in the above process by 0.5 part (by weight) glyoxal per 100 parts polyvinyl alcohol, and heat treatment was limited to a maximum temperature of 80° C.

EXAMPLE 5

The procedure of Example 4 was repeated using an aqueous 2% dextran solution instead of the corresponding polyvinyl alcohol solution. The hydrogel lens obtained was stored in physiological saline solution containing 0.01% mercury cyanate to prevent bacterial attack on the partly cross-linked dextran.

EXAMPLE 6

70 parts (by weight) ethylene glycol monomethacrylate, 20.5 parts diethylene glycol monomethacrylate, and 0.5 part diethylene glycol dimethacrylate were mixed, and the mixture was cooled at −10° C. One part of methylethylketone peracetal dissolved in 5 parts ethylene glycol and 3 parts dimethylaminoethyl acetate were added to the cold monomers, and the mixture was briefly deaerated and poured into molds of the type shown in FIG. 1. The cylindrical tubes 11 of the molds were internally coated with silicone oil to make them water repellant and to prevent the formation of a meniscus on the free surface of the polymerization mixture.

The procedure of Example 3 was then followed to produce a plano-concave xerogel lens which was not in itself useful as a contact lens, but was used successfully as an ocular lens in a telescope which could be held in direct contact with the eye of the viewer.

EXAMPLE 7

A mold of the type shown in FIG. 2 was evacuated and was then charged with the polymerization mixture in Example 3 by means of a syringe, the mixture being refrigerated to −5° C. prior to injection. Copolymerization was substantially completed after two hours at 25° C., and the mold and its contents were thereafter held at 50° C. for 30 minutes. The rubber membrane was carefully removed, and the polymer was found to adhere firmly to the face 5 of the rod 1.

The rod 1 was coaxially clamped in the chuck of a lathe, and the convex face of the xerogel was machined to a hemispherical shape having a diameter of 14 millimeters. In this process, the lens was severed from the polymerized material in the duct 3. It was then ground and polished with oil-suspended abrasives, rinsed with petroleum ether, and the lens and rod were immersed in 60% aqueous ethanol. The lens spontaneously separated from the rod when swelling in the liquid, and was sequentially immersed in fresh batches of the same until all residual amounts of the initiator and activator had been removed. The lens was washed last in warm distilled water, and was finally stored in physiological saline solution containing 3% boric acid.

The mold shown in FIG. 2 makes it unnecessary to use an inert gas blanket during polymerization. The amount of polymer that needs to be removed by machining or grinding is substantially smaller than with the mold of FIG. 1. The duct 3 must be cleaned after each polymerization cycle by drilling it out, and this is a simple operation. If so desired, the duct 3 may be omitted, however, the mold cavity may be evacuated through a vent valve in the rubber membrane 2 preferably near the rim of the latter, and the polymerization mixture may be directly injected into the mold cavity proper through the membrane 2.

If the membrane 2 is chosen in such a manner that it conformingly engages the face 5 when the duct 3 is open to the atmosphere, evacuation of the mold prior to charging with the polymerization mixture is unnecessary. With such a membrane, I prefer to replace the cap 4 by a check valve in the orifices 6 which prevents the polymerization mixture from being expelled from the mold cavity under the resilient force of the membrane.

EXAMPLE 8

A liquid mixture of 95 parts ethylene glycol monomethacrylate, 4.5 parts ethylene glycol, 0.5 part ethylene glycol dimethacrylate, and 0.01 part dibenzoyl peroxide was completely purged of atmospheric oxygen by passing a stream of pure nitrogen therethrough, and was then poured into a mold mainly consisting of two upright parallel glass plates coated with silicon oil and held at a horizontal distance of 3 to 4 mm. from each other by resilient spacers which closed the bottom and sides of the mold cavity. The top of the charged mold was closed with a rubber band. The mold was stored first at ambient temperature for 12 hours, and thereafter at 40° C. for 24 hours.

The polymer plate formed thereby was a rigid xerogel which was cut into blanks of suitable size for making contact lenses by machining, grinding, and polishing. The xerogel lenses were washed with ethanol and distilled water as described in the preceding examples, and were swelled to equilibrium with a physiological saline solution containing 0.002% trimethylcetylammonium bromide. The lenses produced were soft, resilient, and fully transparent.

EXAMPLE 9

A xerogel plate was prepared from a mixture of 80 parts ethylene glycol monomethacrylate, 20 parts diethylene glycol monomethacrylate, 0.4 part ethylene glycol dimethacrylate, and 0.01 part azo-bis-isobutyronitrile in the manner described in Example 8.

Concave and convex spherical surface portions were formed on the two plate surfaces by grinding, a concave portion on one surface being aligned with a convex portion on the other surface. The ground plate, in effect, constituted a multiple contact lens blank from which individual blanks having one convex and one concave surface could be cut. The pre-ground blank was readily adapted to the eye configuration of the prospective wearer by grinding the lens rim according to measurements taken on the patient's eyes in the usual manner, taken into consideration the swelling of the xerogel blank during its conversion to a hydrogel.

EXAMPLE 10

75 parts ethylene glycol monomethacrylate, 20 parts methacrylamide, 4.5 parts acrylamide, and 0.5 part ethylene glycol dimethacrylate were mixed while the temperature of the mixture was held between 40° and 60° C. The mixture was homogeneous and fully transparent as long as its temperature was kept above 30° C. 0.01 part dibenzoyl peroxide was dissolved in the mixture with stirring, and the catalyzed mixture was poured into the mold described in Example 8.

The copolymerization reaction was permitted to proceed in the absence of oxygen for 16 hours at 30° to 35° C., and was completed thereafter by maintaining a temperature of 50° C. for 6 hours. A transparent glassy xerogel was obtained and was converted to hydrogel contact lenses by shaping in the rigid state followed by swelling to osmotic equilibrium with body tissues.

EXAMPLE 11

99.4 parts ethylene glycol monomethacrylate, 0.3 part ethylene glycol.bis.methacrylate and 0.3 part di-isopropyl percarbonate were mixed together at 0° C. The mixture was poured into a glass mold described in Example 9 and polymerized one hour at 40° C. and 30 minutes at 60° C. The xerogel blancs were separated and ground and polished to following size: inner curvature radius 6.6 mm., outer curvature radius 7.8 mm., diameter of the lens 10 mm., central thickness 0.2 mm. After having been washed and equilibrated with 1% sodium bicarbonate aqueous solution, the refractive index of the hydrogel was 1.43, the inner curvature radius 6.95, the outer curvature radius 8.2, the diameter of the lens 11.8 mm. The refractive power was −2.5 D. The weight of the swelling water was 34%.

The water content at the equilibrium with solutions isotonic with human living body varies from about 25 to about 70% water (weight), according to the cross-linking degree. Hydrogels are isotropic systems undergoing to equal dimension changes in all directions. Thus all dimensions are changed proportionally, the shape being retained unchanged. The volume increase forms the curbature of the linear swelling degree. If, e.g., the linear increase of any dimension is +15%, the volume increases to 151%, etc.

Swollen hydrogels according to the invention are further characterized by their very low elasticity modulus, similar to that of soft uncured rubber. By drying said modulus increases rapidly and reaches, in fully dry condition, similar values to that of usual plastics containing no appreciable amount of plasticizers.

It will be appreciated that the preceding examples are merely illustrative of preferred embodiments of this invention, and numerous modifications and variations will suggest themselves to those skilled in the art.

More specifically, useful lenses can be prepared by machining, grinding, and/or polishing xerogels with or without subsequent swelling which are sparingly cross-linked polymers of hydrophilic monomers other than those referred to hereinabove. Other representative monomers useful in the method of the invention include the monoallyl esters of organic dicarboxylic or tricarboxylic hydroxy acids, such as tartaric, malic, or citric acid which may be combined with diallyl esters of the same acids as cross-linking agents. The allyl ethers of sorbitol, mannitol, and of other polyhydric sugars may be polymerized to form xerogels and soft, transparent hydrogels. Glycol monoesters of polymerizable olefinic acids such as itaconic acid or maleic acid may be copolymerized with minor amounts of glycol diesters of these acids. Bis-ethylene glycol itaconate and the oligoesters and polyesters of polymerizable dicarboxylic acids such as itaconic acid may be copolymerized with cross linking agents such as N,N'-methylene-bis-methacrylamide. The methacrylates of polyvinyl alcohol having a relatively low molecular weight also yield useful xerogels and hydrogels.

Monomers which are solid at room temperature may be polymerized at elevated temperature in the presence of initiators which provide free radicals at such temperatures. Methacrylamide may thus be copolymerized with a small amount of N,N'-methylene-bis-ethacrylamide. When eutectic mixtures of monomers are employed, relatively low polymerization temperatures are adequate, as illustrated in Example 10.

The invention is not limited to the use of specific initiators and catalysts. Even ionic catalysts may be employed successfully in the absence of water and other inhibitors.

Obviously, many other modifications and variations of the present invention are possible in the light of the above teachings. It is therefore to be understood that within the scope of the appended claims, the invention may be practiced otherwise than as specifically described.

What I claim is:
1. A method of preparing a contact lens which comprises:
   (a) preparing a lens blank from a xerogel, the xerogel being a sparingly cross-linked organic polymer having recurring hydrophilic groups in the molecule thereof;
   (b) removing selected portions of said blank until the remainder of the blank constitutes a replica of the desired lens on a reduced scale; and
   (c) contacting said replica with an aqueous liquid until the replica swells to a state of osmotic equilibrium with physiological saline solution.
2. A method as set forth in claim 1, wherein said xerogel is prepared by slowly drying a hydrogel of said sparingly cross-linked organic polymer, the hydrogel being resiliently deformable.
3. A method as set forth in claim 1, wherein said xerogel is prepared by removing a swelling liquid from a hydrogel of said sparingly cross-linked organic polymer, said hydrogel being resiliently deformable.
4. A method as set forth in claim 1, wherein said xerogel is prepared by co-polymerizing a mono-olefinic hydrophilic monomer with a small amount of a cross-linking agent substantially in the absence of a swelling agent.
5. A method as set forth in claim 1, wherein said replica is contacted with physiological saline solution until in a state of osmotic equilibrium therewith.
6. A method as set forth in claim 1, wherein said selected portions are removed from said blank by frictional contact with an abrasive.
7. A method as set forth in claim 1, wherein said selected portions are removed by grinding and polishing said blank.
8. A method as set forth in claim 1, wherein said blank is prepared by co-polymerizing a major amount of a mono-olefinic hydrophilic monomer with a minor amount of a cross linking agent in a mold having a convex face, whereby a blank having a conforming concave face is formed, said portions of said blank being removed from a face of the blank opposite said concave face.
9. A method as set forth in claim 8, wherein said portions of said blank are removed from said opposite face while said concave face is in conforming contact with said convex mold face.
10. A method as set forth in claim 9, wherein said replica is contacted with said aqueous liquid until said concave face of said replica is spontaneously lifted from said convex mold face.

References Cited

UNITED STATES PATENTS 2,332,930  10/1943  Rinia _____ 264—1
3,030,859  4/1962  Elliott _____ 264—162

ALEXANDER H. BRODMERKEL, *Primary Examiner.*

A. H. KOECKERT, *Assistant Examiner.*